Sept. 17, 1968   J. H. KEMP, JR   3,401,808
APPARATUS FOR STACKING PALLETS
Original Filed Aug. 10, 1962   2 Sheets-Sheet 1

INVENTOR.
JOHN H. KEMP, JR.
BY
ATTORNEY

Sept. 17, 1968   J. H. KEMP, JR   3,401,808
APPARATUS FOR STACKING PALLETS
Original Filed Aug. 10, 1962   2 Sheets-Sheet 2

INVENTOR.
JOHN H. KEMP, JR.
BY
ATTORNEY

United States Patent Office 3,401,808
Patented Sept. 17, 1968

3,401,808
APPARATUS FOR STACKING PALLETS
John H. Kemp, Jr., 140 Greenoaks Drive,
Atherton, Calif. 94025
Original application Aug. 10, 1962, Ser. No. 216,100.
Divided and this application Aug. 23, 1965, Ser.
No. 481,763
3 Claims. (Cl. 214—6)

ABSTRACT OF THE DISCLOSURE

The pallet-stacking machine includes a conveyor for delivering a pallet into a storage magazine. A cam-operated, vertically movable carriage is arranged on each side of the magazine, each carriage being equipped with cam operated, horizontal pivotal support arms for engaging and supporting a stack of pallets. The machine is synchronized in operation to receive a delivered pallet beneath a stack of pallets in the magazine when the stack is supported vertically by the support arms. The stack is then set down upon the delivered pallet and the support arms pivoted to an outward position. The carriage is then lowered to a point where the arms may be pivoted inwardly to engage the delivered pallet and the carriages are then raised to elevate the stack for receiving the next pallet in the magazine.

Specification

This application is a division of my copending application, Ser. No. 216,100, filed Aug. 10, 1962, now abandoned. The present invention relates to an apparatus for handling pallets, and particularly concerns an apparatus for arranging pallets into a vertical stack.

In the said copending application, there is disclosed a machine for exchanging pallets whereby an exchange pallet is substituted for an incoming loaded pallet. In that machine, there is provided a conveyor line that passes through a transfer or exchange station. The pallets conducted along the conveyor line are of a type having slots or other suitable openings therein through which lift fingers of an elevator disposed below the conveyor line may pass. Positioning means on the conveyor line stops a pallet in the proper transfer position, the lift fingers rise until they pass through a pallet and engage and lift the load free thereof. Then, a transfer fork, having a plurality of tines, is extended horizontally to pass between the elevator lift fingers so as to be disposed between the load and the pallet from which it was removed. Then, the elevator is again lowered until the load is supported on the transfer fork and the lift fingers are then retracted from the pallet slots, so that the pallet is free to move along the conveyor. In this operation, a pallet-unstacking mechanism, disclosed and claimed in my copending application Ser. No. 481,854, filed Aug. 23, 1965, now Patent No. 3,269,568, which issued on Aug. 30, 1966, shifts a pallet one at a time from a supply, and the shipper's pallet is moved from the transfer station towards a pallet-stacking apparatus while the replacement pallet is moved in place at the transfer or exchange station. When the replacement pallet is properly positioned, the lift fingers are again raised to pass through the slots of the replacement pallet and move up past the tines of the transfer fork to remove the load therefrom, freeing the transfer fork to be retracted out from under the load. Finally, the lift fingers are again lowered to replace the load on the replacement pallet and are then withdrawn through the slots of the replacement pallet to free it for removal to a delivery station, thus completing the transfer.

An object of this invention is to provide a pallet stacking apparatus which may be employed with the machine of said copending application Ser. No. 216,100, filed Aug. 10, 1962, now abandoned.

Another object of this invention is to provide an apparatus adapted to retrieve from a conveyor an incoming pallet after its unloading and to shift the pallet from the conveyor into a zone for storage.

Still another object of the invention is to provide a simple but rugged apparatus for moving vertically a plurality of pallets arranged in a stack so as to permit another pallet to be inserted into the bottom of the stack.

A further object of this invention relates to the provision for receiving unloaded, incoming pallets from an associated pallet exchange apparatus and the stacking of the pallets in a neat and convenient manner so as to permit ready removal of the pallets for return to the owner thereof.

Additional objects of the invention will appear from the following description in which the preferred embodiment of the invention has been set forth in detail in conjunction with the accompanying drawings.

Referring to the drawings.

In the above mentioned application Ser. No. 216,100, filed Aug. 10, 1962, a machine is disclosed for exchanging pallets whereby an exchange pallet is substituted for an incoming pallet. That machine includes conveyor means forming three aligned conveyor sections, each adapted to support a loaded pallet for movement over the same. The first conveyor section serves as an incoming conveyor for a loaded incoming pallet and also as an incoming conveyor for an exchange pallet delivered thereto from a pallet unstacker apparatus, the subject matter of my copending application Ser. No. 481,854, filed Aug. 23, 1965, now Patent No. 3,269,568, which issued on Aug. 30, 1966. The second conveyor section forms a pallet transfer or exchange station. The third conveyor section forms an outgoing conveyor for an outgoing loaded pallet and also serves as an outgoing conveyor for an incoming unloaded pallet to be delivered to a pallet stacker apparatus, the subject matter of the present invention.

Figure 1:
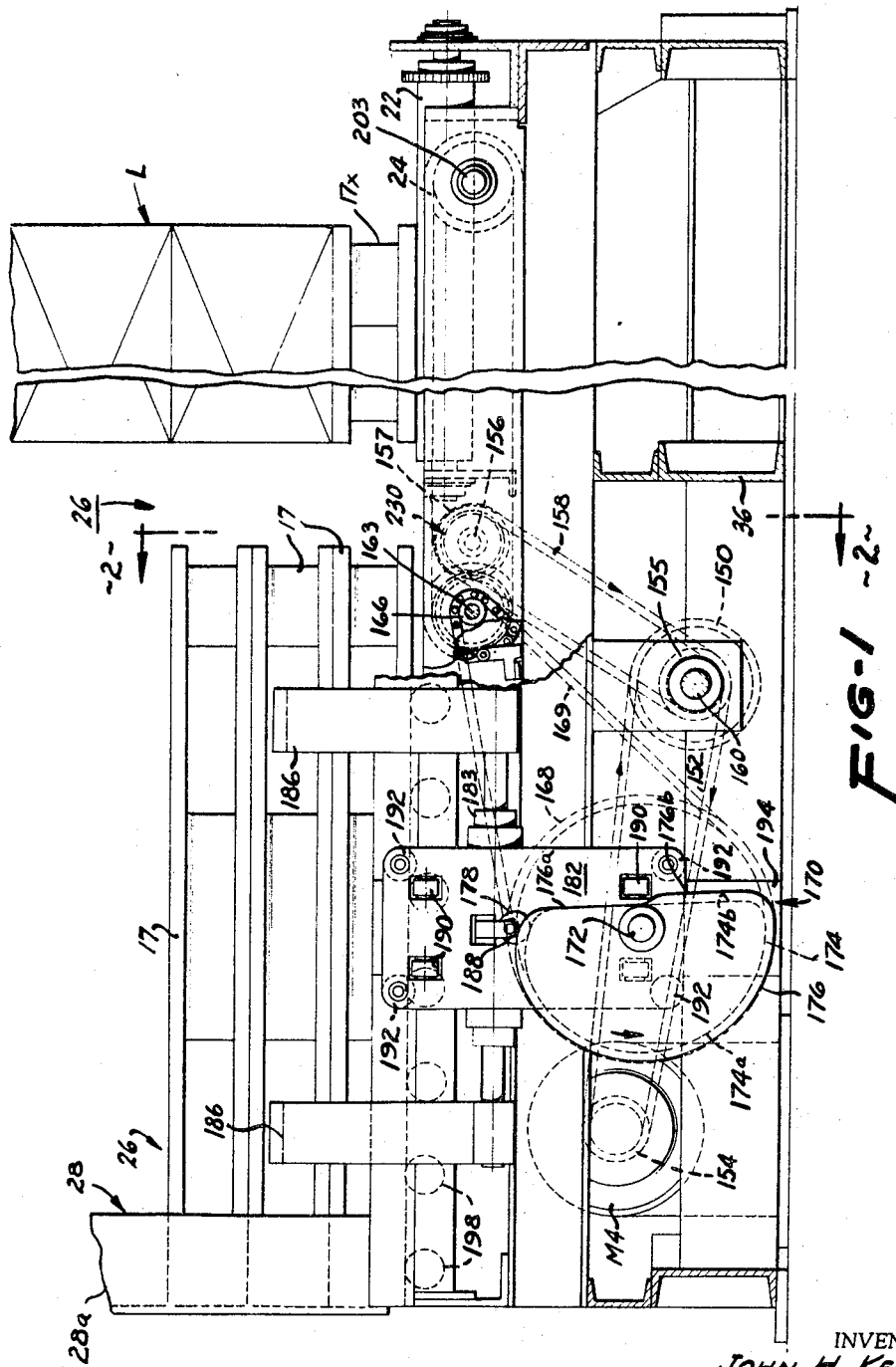
FIG. 1 is a side view showing a pallet-stacking mechanism made in accordance with and embodying the features of the present invention.

An apparatus for stacking pallets made in accordance with and embodying the principles of the present invention is shown in the accompanying drawings and is designated generally by the numeral 26. The stacking apparatus 26 includes a magazine 28 and a stacking conveyor 24 which functions to deliver an unloaded incoming pallet 17 to the magazine 28 from an outgoing conveyor 22 extending transversely in the stacking conveyor 24. In FIG. 1 an exchange pallet 17x is shown supporting a load L disposed on a section of the aforementioned aligned conveyor system which constitutes the outgoing conveyor 22. As shown in the drawings, the aforementioned parts may be mounted upon a framework 36 fabricated from commercially available structural shapes in a manner well understood in the art.

Figure 2:
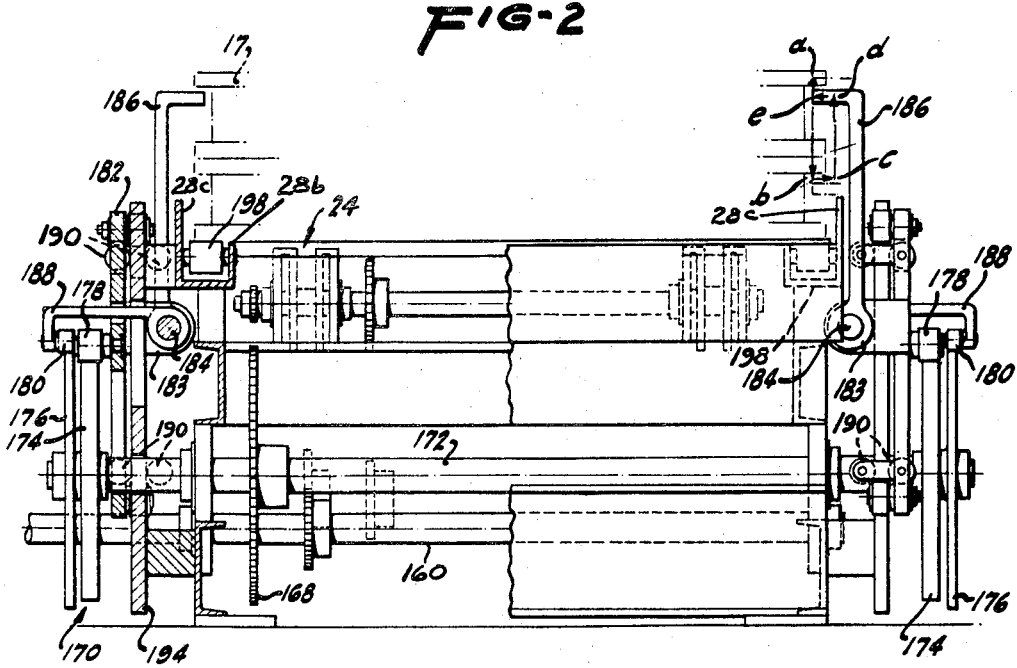
FIG. 2 is a sectional view taken along the lines 2—2 of FIG. 1.

The magazine 28, as shown in FIGS. 1 and 2, is arranged to receive and to hold a plurality of pallets 17 disposed in a vertical stack. A spaced apart pair, only one of which is shown in FIG. 1, of generally vertically extending angle members 28a defines the rear corner portions of the magazine 28 so that when a plurality of pallets have been deposited individually in the magazine 28 through the open front portion thereof, the corner angle members 28a ensure that the pallets 17 are supported horizontally to resist lateral shifting off of the framework 36, thus permitting the pallets to grow into a vertical stack. The lowest pallet 17 in the stack rests upon a spaced pair of rows of transverse feed rollers 198 which extends in the direction of the stacking conveyor 24 and is disposed on each side thereof, as shown best in FIG. 2. Each transverse feed roller 198 is suitably journaled in an upwardly opening channel member 28b having an outer flange 28c extending vertically above the rollers 198 to define a side element of the magazine 28.

One of the functions of the pallet stacking apparatus 26 is to shift an unloaded incoming pallet 17 from the outgoing conveyor 22 into the lower portion of the magazine 28 beneath a stack of previously inserted incoming pallets 17 disposed therein. A step in achieving this involves elevating the previously inserted pallets with respect to the transverse rollers 198 a distance greater than the height of the incoming pallet 17. A subsequent step is to shift the incoming and unloaded pallet 17 with the stacking conveyor 24 into the magazine 28 while the stack of pallets 17 is in the elevated condition. Then the stack may be lowered to rest upon the pallet inserted therein. The mechanism through which these functions are realized includes a main drive shaft 160 which may also be the drive shaft for the pallet unstacker assembly (not shown) and load transfer forks (not shown) disclosed in said copending application Ser. No. 216,100.

A motor M4, shown best in FIG. 1, supplies power to the drive shaft 160 through a sprocket 150 mounted thereon and a cooperating drive chain 152, the drive chain 152 being in cooperative engagement with a sprocket 154 suitably mounted upon the motor M4.

The stacker conveyor 24 is powered from the drive shaft 160 by means of a second sprocket 155 mounted thereon which serves to drive a counter-shaft 156 through the medium of a counter-shaft sprocket 157 and an endless chain 158, as shown in FIG. 1. A meshing pair of gears 230 is mounted to drive a stacker conveyor drive shaft 163 in the opposite direction from the counter-shaft 156. A sprocket 166 on the conveyor drive shaft 163 drives a large sprocket 168 through an endless chain 169 to rotate a composite control cam 170 keyed therewith on a shaft 172.

Referring to FIG. 2, it will be noted that a composite cam 170 is mounted on each end of the shaft 172 and each cam comprises a vertical motion-controlling disc 174 and a horizontal motion-controlling disc 176, each controlling the movement of a roller follower 178 and 180, respectively. The follower 178 is rotatably mounted in a vertically slidable carriage 182 to which are secured bearing brackets 183 rotatably supporting a shaft 184. To each shaft 184 is keyed two or more upright pallet support arms 186 and a generally horizontal cam follower arm 188 rotatably carrying the cam follower roller 180 so that the arms 186 and 188 together form a bell crank lever.

As the vertical control follower 178 traverses the cam disc 174 the slidable carriage 182 is raised and lowered in accordance with the high and low dwells 174a and 174b of the cam disc 174. It will also be seen from FIG. 1 that the cam 176 is concentric with the cam 174 except along a portion of the low dwell 176a. Thus, for most of the cam cycle, the followers 178 and 180 move up and down in unison, but in the low dwell portion 176a the horizontal control follower 180 moves down relative to the follower 178 and the bell crank is pivoted to swing the pallet support arms 186 outwardly. The vertical movement of the carriage 182 is guided by rollers 190 and 192 engaging the faces and sides, respectively, of a guide plate 194, as shown in FIGS. 1 and 2.

The carriage 182 and associated arms 186 on each side of the magazine 28 may begin a cycle with the cam followers 178 and 180 and the cam discs 174 and 176 in the position shown in FIG. 1. The arms 186 are disposed at point e, as indicated in FIG. 2, in a non-supporting relation to the stack of pallets which are then supported vertically upon the transverse rollers 198. As the cam discs 174 and 176 turn together counterclockwise, as viewed in FIG. 1, the arms 186 pivot to clear the margins of the pallets so as to occupy point d as the cam follower 180 moves into the low dwell 176a. As the cam followers 178 and 180 approach the center of rotation of the cam discs, the carriage 182, in response to the program of cam disc 174, descends to a position wherein the arms 186 are disposed at point c. As the cam follower 180 passes the center of cam rotation, the follower 180 passes over a ramp leading to a low dwell 176b which causes the arms 186 to pivot inwardly to point b so as to place a horizontal portion of the arms beneath the margins of the bottom pallet, as shown in FIG. 2. As the followers traverse the high dwells of the cam discs 174 and 176, the carriage 182 and arms 186 are elevated, thereby elevating the stack of pallets 17 to a position wherein the arms occupy the original position at point a, preparing the stack for delivery of the next pallet.

Figure 3:
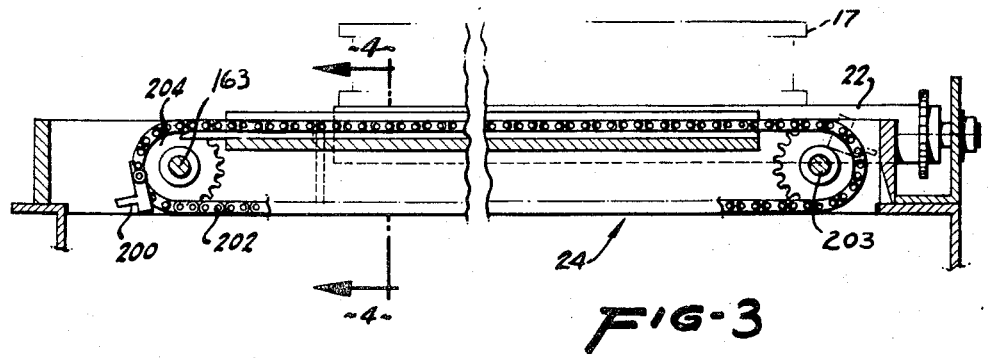
FIG. 3 is a sectional view of a stacker conveyor mechanism of the present invention.
Figure 4:
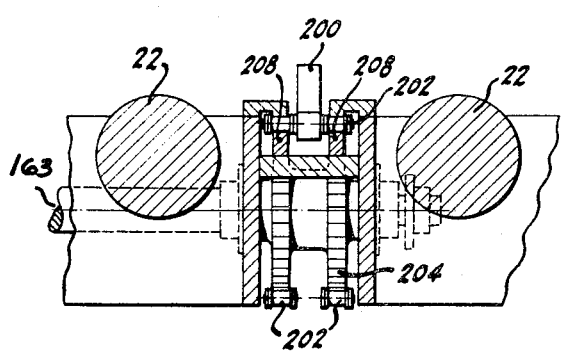
FIG. 4 is a partial sectional view of the conveyor mechanism of FIG. 3 taken along the lines 4—4 thereof.

When the support arms 186 are in their uppermost position at point a (FIG. 2) they support the pallet stack high enough to permit a pallet 17 to travel along the transverse feed rollers from the outgoing conveyor 22, the pallet being conveyed by the stacker conveyor 24. The stacker conveyor 24, as shown in FIG. 3, is powered from the shaft 163 and includes the double sprockets 204 mounted on the shaft 163 and a pair of endless chains 202 carrying a feed dog 200. The stacker conveyor 24, which extends across the outgoing conveyor 22, includes a stub idler-shaft 203 having double sprockets 204 mounted thereon and suitably journaled between two of the rollers of the outgoing conveyor 22.

An incoming pallet 17 disposed on the outgoing conveyor 22, as shown in broken lines of FIG. 3, will be engaged by the feed dog 200 and urged towards the left, as viewed in FIG. 3, into the lower portion of the magazine 28 beneath the stack of pallets then supported by the arms 186. Being that the stacker conveyor 24 is driven from the shaft 163, which also drives the composite cams 170, the stacker conveyor is driven in timed relation to the composite cams 170 which control the movement of the pallet support arms 186.

To summarize the operation of the pallet stacker 26 it will be assumed that the magazine 28 is devoid of pallets 17 but that a pallet is suitably positioned on the outgoing conveyor 22 for cooperation with the stacker conveyor 24 for transfer into the magazine 28. The motor M4 is set into operation to rotate the drive shaft 160 and the associated gear train which drives the shaft 163 serving to drive the stacker conveyor 24 as well as the shaft 172 which rotates the composite cams 170. The stacker conveyor 24 is driven counter-clockwise, as viewed in FIG. 3, to bring a feed dog 200 into engagement with the pallet 17 to convey the pallet from the outgoing conveyor 22 into the magazine 28 to be supported therein on the rollers 198.

At the time the pallet 17 enters the magazine 28 the pallet support arms 186 may be disposed at point e, as shown in FIG. 2. As the composite cams 170 on the shaft 172 turn counter-clockwise, as shown in FIG. 1, the arms 186 pivot outwardly to point d. As the composite cams 170 continue through their cycle the arms 186 move downwardly to point c while yet in their outwardly pivoted condition. Then, the pallet support arms 186 move inwardly to point b projecting a horizontal portion thereof beneath the side margins of the pallet 17 previously shifted therein by the pallet stacker conveyor 24.

The composite cam 170 causes the arms 186 and carriages 182 to move upwardly so as to carry the pallet 17 a distance above the rollers 198 greater than the height of a pallet, the arms then being in position a, shown in FIG. 2. Thereafter, the stacker conveyor 24, which has continued through its cycle to place a feed dog in the position shown in broken lines of FIG. 3, is set to shift a second pallet 17 into the magazine beneath the pallet supported by the arms 186. Upon the shifting of a second pallet 17 into the magazine 28 beneath the pallet supported by the arms 186, the composite cams 170, synchronized with the stacker conveyor 24, causes the arms 186 and carriages 182 to descend slightly so that the arms move from point *a* to point *e*. At this time the prior pallet rests upon the pallet subsequently inserted in the magazine 28. In this fashion, a stack of pallets may grow within the magazine 28.

When the arms 186 are in their outwardly disposed condition, the stack of pallets 17 may be removed from the magazine 28 by means of a lift truck (not shown), the tines of which may extend between the supports 28a and elevate the stack clear thereof.

From the foregoing, it is clear that the apparatus as shown and described herein is useful for stacking pallets received from a pallet exchange apparatus into a vertically extending array. While there has been described what is considered at present to be the preferred embodiment of the invention, it will be understood that various modifications may be made therein, and it is intended to cover in the appended claims all such modifications as fall within the true spirit and scope of the invention.

I claim:

1. A pallet-handling mechanism comprising: a magazine including a pair of opposed upright sides adapted to accommodate a stack of pallets therebetween, a conveyor extending into said magazine and serving to move pallets into said magazine, a pair of carriages, each mounted for vertical movement on one side of said magazine, at least one pallet-supporting arm pivotally mounted on each of said carriages, said arms being movable to engage or disengage opposite sides of the lowermost one of the stacks of pallets to support such stack above said conveyor, and first and second pairs of cams rotatable together to operate said carriages and said arms, respectively, when a pallet is delivered by said conveyor below said stack, said first pair of cams being formed to lower said carriages with said arms in engagement with the stack to rest said stack on said delivered pallet, the second pair of cams being formed to pivotally move said arms outwardly from engagement with the supported pallets, said first pair of cams also thereafter serving to move said carriages with said arms downwardly to the level of said delivered pallet, the second pair of cams then serving to pivot said arms inwardly to engage said delivered pallet, the first pair of cams then serving to raise said carriages and said arms to elevate said delivered pallet and the stack thereon above said conveyor a distance sufficient to permit insertion of another pallet below the stack.

2. A pallet-stacking apparatus comprising a magazine for retaining a plurality of pallets in a vertical stack, pallet transfer means extending into the lower portion of said magazine serving to deliver a pallet into the magazine, a pair of carriages each mounted for vertical movement on one side of said magazine, cam means rotatably mounted adjacent to each carriage, a rocker shaft rotatably mounted on each carriage and vertically movable therewith, at least one pallet-engaging support arm secured to said rocker shaft for pivotal movement into and out of engagement with a delivered pallet in said stack, each of said cam means including a first cam serving to move the corresponding carriage vertically and a second cam serving to rotate the corresponding rocker shaft to pivot the corresponding arm with respect to said stack, power means for cyclically rotating said cam means, cam follower means on said carriage and on said rocker shaft respectively engaging said first and second cams, said cam means being formed whereby in one cycle of rotation they effect movement of said carriages together with said arms downwardly to deposit said stack on the pallet last delivered by said transfer means, said arms are then swung outwardly to effect disengagement with the stack, said carriages are moved with said arms downwardly to the level of the delivered pallet, said arms are moved inwardly to engage said delivered pallet, and then said carriages are raised with said arms thereby to raise the stack a distance sufficient to permit insertion of another pallet into said magazine.

3. The apparatus of claim 2 wherein said pallet transfer means operates to shift a delivered pallet into said magazine when the stack of pallets is held on said arms in an elevated condition.

References Cited

UNITED STATES PATENTS

| 2,251,197 | 7/1941 | Nestmann | 214—6 |
| 2,947,405 | 8/1960 | Fenton | 214—6 |
| 2,966,018 | 12/1960 | Corrie | 214—6 |
| 3,013,680 | 12/1961 | Paxton | 214—8.5 |
| 3,043,476 | 7/1962 | Zwgrycz | 214—8.5 |
| 3,245,557 | 4/1966 | Maramonte et al. | 214—6 |

ALBERT J. MAKAY, *Primary Examiner.*